United States Patent [19]

Bernard

[11] Patent Number: 4,735,454
[45] Date of Patent: Apr. 5, 1988

[54] PICKUP TRUCK LOADING RAMP

[76] Inventor: John N. Bernard, 10950 Darryl Dr. #297, Baton Rouge, La. 70815

[21] Appl. No.: 687,948

[22] Filed: Dec. 31, 1984

[51] Int. Cl.$^4$ ............................................. B62D 25/00
[52] U.S. Cl. .................................. 296/61; 296/57 R; 296/51
[58] Field of Search ................... 296/50, 51, 57 R, 60, 296/61, 62, 26, 59; 414/537

[56] References Cited

U.S. PATENT DOCUMENTS

| | | | |
|---|---|---|---|
| 2,603,529 | 7/1952 | Troth et al. | 296/61 |
| 2,727,781 | 12/1955 | D'Eath | 414/537 X |
| 2,797,960 | 7/1957 | Endres et al. | 296/61 |
| 2,829,001 | 1/1958 | Leaphart | 296/57 R |
| 3,352,440 | 11/1967 | Wilson | 296/61 X |
| 3,656,801 | 1/1972 | Doutt et al. | 296/57 R |
| 3,895,838 | 7/1975 | Hamada | 296/57 R |
| 3,976,209 | 8/1976 | Burton | 296/61 X |
| 4,023,850 | 5/1977 | Tillery | 296/58 X |
| 4,171,844 | 10/1979 | Landaal et al. | 296/59 X |
| 4,353,589 | 10/1982 | Hartberg | 296/50 |

Primary Examiner—Robert B. Reeves
Assistant Examiner—Russell D. Stormer

[57] ABSTRACT

A bifold loading ramp that is interchangeable with the tailgate of a pickup truck. A ramp consisting of two halves that are hinged in the middle with the upper half having existing tailgate latch assemblies welded to it, so as to allow it to attach to the bed of a pickup truck in the same manner as the tailgate. The latch assemblies hold the ramp in the vertical position when locked. When unlocked it pivots to a horizontal position being held in position by the existing tailgate support brackets making for a tailgate extension. When the tailgate support brackets are unhooked the ramp can then be unfolded forming a gradually inclined ramp from the ground to the bed of the truck.

1 Claim, 2 Drawing Sheets

PICKUP TRUCK LOADING RAMP

BACKGROUND

The present invention relates to a loading ramp that is interchangeable with the tailgate of a pickup requiring no alterations of the tailgate nor the tailgate mounting devices.

DESCRIPTION OF THE PRIOR ART

Pickup trucks have become very expensive vehicles. Often used as the only family vehicle. They are beautifully designed both interior and exterior. This same pickup is often used to transport recreational vehicles, lawnmowers, and other cargo. This invention simplifies the loading and unloading of such cargos without alterations of or damage to the tailgate or the truck bed.

Other state of the art ramps, either encompass the use of the tailgate, as in Wilson U.S. Pat. No. 3,352,440, or bolted to the bed of the truck as in D'Eath U.S. Pat. No. 2,727,781.

The ramps that attach to the tailgate often result in damage to the tailgate upon installation, while in use, or during transport. Some also cause a storage problem as they must be stored in the bed of the truck with the cargo.

The ramps that are bolted cause damage to the truck bed upon installation and are difficult to operate.

The prior art discloses no ramp that is interchangeable with the tailgate making installation and use quick and easy with no storage problem, while at the same time when removed leaves the truck bed and tailgate with no damage.

SUMMARY

A pickup truck loading ramp is presented. The ramp is interchangeable with the tailgate. The ramp utilizes the existing tailgate mounting hardware. When finished with the ramp the tailgate is simply reinstalled to the original mounts and has not been damaged nor altered in any manner. The ramp serves a secondary purpose when in the intermediate position. The ramp provides a pickup truck bed extension. This is useful when transporting overlength loads such as lumber. This ramp presents no storage problem as it becomes the tailgate when folded to the vertical position.

DRAWING SUMMARY

FIG. 5 is a side view of the ramp in the intermediate or horizontal position.

DETAILED DESCRIPTION

This invention has two main sections, the upper section 2 and the lower section 3, constructed of square tubing or similar materials, hinged together to form a bifold ramp 2,3 that is attached to the pickup truck bed 4 in the same manner in which the tailgate is attached to the pickup truck.

Figure 3:
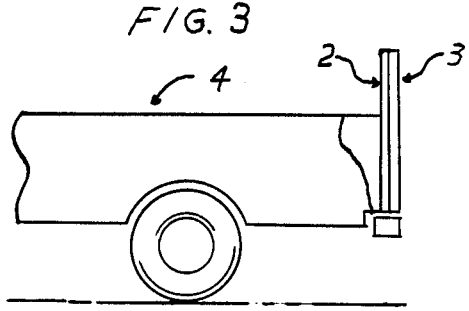
FIG. 3 is a side view shown fully folded in the upright or vertical position.
Figure 4:
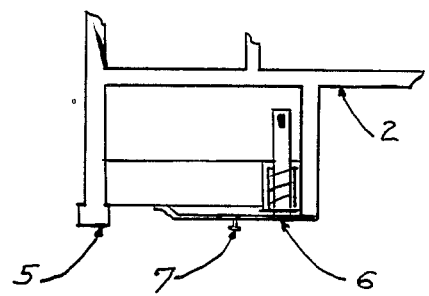
FIG. 4 is an enlarged view of the latch assembly with which the ramp is locked onto the pickup bed.

When the ramp 2,3 is in the stored position FIG. 3 it is folded and secured into place in the vertical position by the tailgate latch assemblies 6 and the tailgate pivot mounts 5.

When the invention is in the intermediate position FIG. 5, it is folded, and the upper section 2 is attached by the tailgate support bracket 1 connected to the support bracket pin 7 and the tailgate pivot mounts 5. The lower section 3 just simply rests on the bumper. The invention is now in a horizontal plane parallel to the bed of the truck 4 acting as a truck bed extension.

Figure 1:
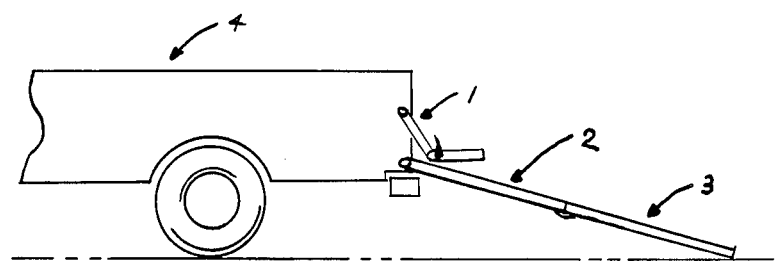
FIG. 1 is a side view of the ramp in its loading position.
Figure 2:
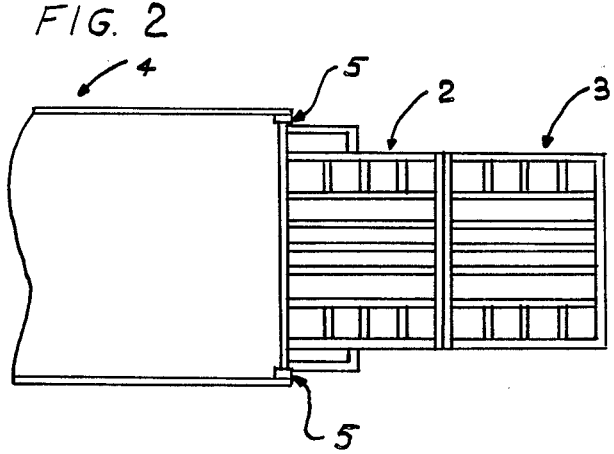
FIG. 2 is a top view of FIG. 1.

When the invention is in the fully extended position FIG. 1, it is now unfolded forming a ramp 2,3 from the ground to the bed of the truck 4. It is connected to the truck by just the tailgate pivot mounts 5.

To convert from the vertical position FIG. 3 to the intermediate position FIG. 5, you simply unlatch the tailgate latch assemblies 6, and swing the ramp down.

To convert to the ramp position FIG. 1 from the intermediate position FIG. 5, you simply disconnect the support brackets 1 from the pins 7.

It will of course be understood that various changes may be made in the form, detail, arrangement, and proportions to accomodate the various types of tailgate mounting hardware for the various types of pickups without departing from the scope of my invention.

What I now claim is:

1. In a pickup truck having a rear bumper and a conventional tailgate mounted to the rear of the truck and having hardware for mounting the tailgate, the improvement comprising a tailgate assembly interchangeable with the conventional tailgate and employing said hardware for mounting said tailgate assembly, said tailgate assembly comprising an upper member and a lower member each having front and rear sides, the front side of said upper member being pivotally attached to the pickup truck to allow the member to pivot from a vertical position to an extended position, the front side of said lower member is hingedly attached to the rear side of said upper member, said lower member being foldable against the upper member such that when said upper member is in a vertical position the members form a tailgate for the truck, and in a horizontal position the members form a truck bed extension with the rear end of the lower member resting on the rear bumper of the truck, the members being unfoldable to be extended rearwardly to form a loading ramp for the truck.

* * * * *